United States Patent [19]
Osborn et al.

[11] 3,899,733
[45] Aug. 12, 1975

[54] APPARATUS FOR COMPENSATING FOR INSTRUMENTATION LOSS

[75] Inventors: Merlin L. Osborn, Saxonburg; Layton D. Crytzer, Natrona Heights; Donald M. Stewart, Tarentum, all of Pa.

[73] Assignee: Allegheny Ludlum Industries, Inc., Pittsburgh, Pa.

[22] Filed: Mar. 4, 1974

[21] Appl. No.: 447,801

[52] U.S. Cl. .............................................. 324/34 R
[51] Int. Cl. ........................................... G01r 33/00
[58] Field of Search ................. 324/34 R, 34 PE, 40

[56] References Cited
UNITED STATES PATENTS
2,054,020  9/1936  Journeaux ........................... 324/40
2,993,166  7/1961  Schlieker et al. ................. 324/34 R

*Primary Examiner*—Robert J. Corcoran
*Attorney, Agent, or Firm*—Vincent G. Gioia; Robert F. Dropkin

[57] ABSTRACT

Apparatus for compensation of instrumentation loss where the instruments are preceded by a ratio transformer which may be changed with test conditions. As this first ratio transformer is changed the correction needed for instrumentation loss also changes. The apparatus consists of an isolation transformer with its primary connected across the variable power source and a second ratio transformer connected to the secondary of the isolation transformer. This second ratio transformer is mechanically coupled to the first ratio transformer so that the arms are moved in unison to corresponding positions. The second ratio transformer has a load applied approximately equal to the load of the first ratio transformer and thus their exciting currents are approximately equal. The resultant current of the isolation transformer secondary and the second ratio transformer is applied to a portion of the test circuit in such a manner as to buck out the part of the exciting current that is due to the instrumentation.

7 Claims, 1 Drawing Figure

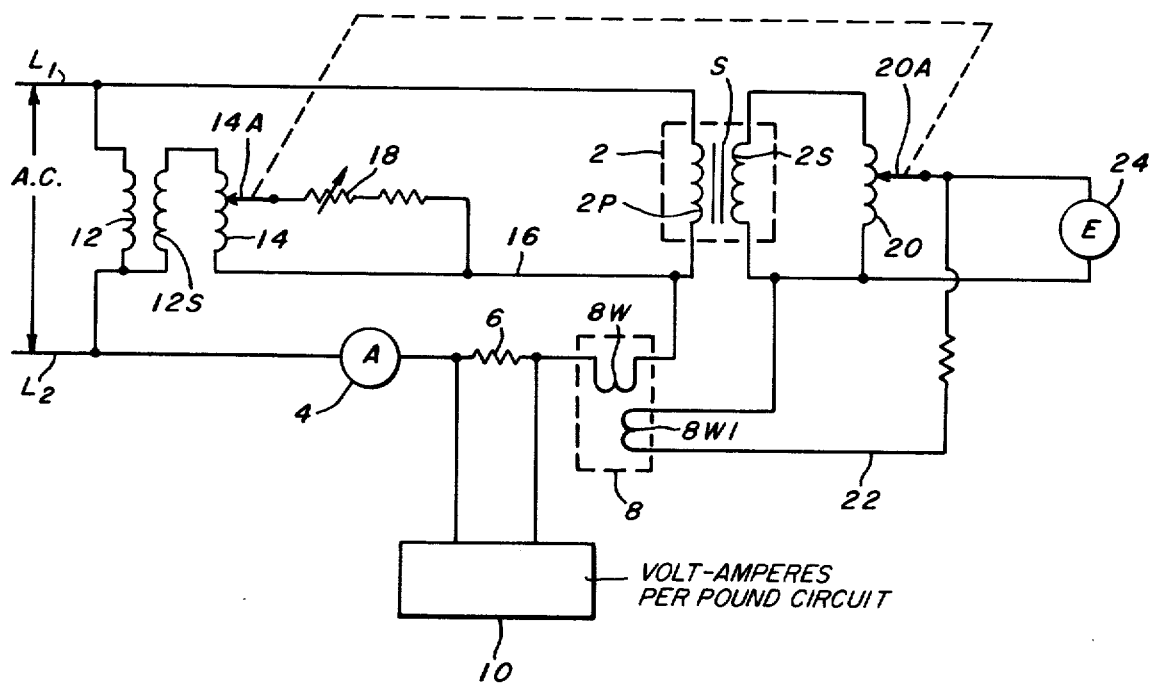

APPARATUS FOR COMPENSATING FOR INSTRUMENTATION LOSS

This invention relates to apparatus for compensating for instrumentation loss and more particularly to such apparatus for testing silicon steel. Such testing apparatus includes a test frame having a primary and secondary for receiving the test samples. The well known Epstein frame and test is an example of this type of apparatus. This includes instruments in both the primary and secondary circuits and the losses in the instruments are a significant portion of the total losses in the load. Thus without compensation the readings obtained will be incorrect. The readings may be corrected mathematically, but this is time consuming and may be inaccurate. The circuits may be set up to compensate for instrumentation loss under certain conditions, but if these conditions change, such as when changing the size of the samples, errors will occur. Compensating circuits have been proposed and used, but those of which we have knowledge are not completely satisfactory. They may be inaccurate and/or expensive to make and/or maintain.

It is therefore an object of our invention to provide apparatus for automatically compensating for instrumentation loss which is accurate and inexpensive.

Another object is to provide such apparatus for use in testing silicon steel samples which permits accurate direct readings to be obtained.

These and other objects of the invention will be best understood from the following description, reference being had to the accompanying drawing wherein:

The single FIGURE is a schematic diagram of our invention used with silicon steel testing apparatus.

Referring more particularly to the drawing reference numeral 2 indicates a standard Epstein frame having a primary 2P and a secondary 2S. A conditioned A.C. power source $L_1$, $L_2$ has its lead $L_1$ connected to one side of primary 2P and its lead $L_2$ connected to the other side of primary 2P through ammeter 4, resistor 6 and winding 8W of wattmeter 8 connected in series. A volt-amperes per pound circuit 10 is connected across resistor 6. An isolation transformer 12 is connected across power source $L_1$, $L_2$ and has its secondary 12S connected to one side of a ratio transformer 14, the other side of which is connected to the second side of primary 2P through a third lead 16. Arm 14A of transformer 14 is connected through variable resistor 18 to lead 16 and hence, to the second side of primary 2P. A ratio transformer 20, similar to transformer 14 is connected across secondary 2S. Arm 20A of transformer 20 is connected through lead 22 to winding 8W1 of wattmeter 8 and then to secondary 2S. A fluxmeter 24 is connected across the output of transformer 20. Arms 14A and 20A are mechanically connected so that they will move in unison. Each of the transformers has a metal core.

Resistor 18 is adjusted so that its resistance is approximately equal to the combined effective resistance of coil 8W1 and fluxmeter 24. Thus, at all times the same load is applied to the output of ratio transformer 14 as that which is supplied by isolation transformer 12 at essentially the same voltage as ratio transformer 20 so that the exciting currents of the ratio transformers will be essentially equal. Since the current of transformer 14 is in series opposition with the exciting current of instruments 4, 6 and 8 in such a manner as to buck out the portion of the exciting current due to the instrumentation, a correct reading will be obtained by the instruments regardless of the weight of sample placed in the frame 2.

The operation of our device is as follows:

For a particular sample weight arm 20A is adjusted so that fluxmeter 24 will indicate directly in kilogauss rather than in volts and wattmeter 8 will indicate watts per pound. The input voltage is adjusted so that fluxmeter 24 will read at desired sample induction level.

The Epstein frame 2 may be of the overlap or butt type both of which use a number of test strips S. The test strips S are generally 3 cm. by 28 to 30½ cm. having a thickness between 10 and 30 mils. Other frames may use a single test strip or sample. Regardless of the type of frame the operation of our device is the same. When the weight of sample is changed the arm 20A is also changed so that the instruments will continue to read directly in magnetic units. At the same time arm 14A is changed accordingly so that its position corresponds to the position of arm 20A.

While one embodiment of the invention has been shown it will be apparent to those skilled in the art that the novel principles disclosed herein will suggest various other modifications and applications of the same. It is accordingly desired that in construing the breadth of the appended claims they shall not be limited to the specific examples of the invention described herein.

We claim:

1. A measuring apparatus with means for compensating the measurement for instrumentation loss comprising a load, a power source, an isolation transformer having its primary connected across said power source, a first lead from a first side of said power source to the first side of said load, a second lead from a second side of said power source to the second side of said load, at least one instrument connected in said second lead, a third lead from one side of the secondary of said isolation transformer to said second side of said power source, a first ratio transformer, one side of said ratio transformer connected to the other side of the secondary of said isolation transformer, said ratio transformer including a slide arm, a variable resistor connected to said slide arm across said first ratio transformer, the second side of said ratio transformer being connected to the second side of said load a second ratio transformer connected across said first named load, a second instrument, said second ratio transformer including a slide arm connected to one side of said second instrument, a lead connecting the other side of said second instrument to said second ratio transformer, and means for moving said slide arms in unison to corresponding positions.

2. Apparatus according to claim 1 in which there are two instruments in said second lead, an ammeter and a wattmeter, the first wattmeter coil connected in series with said ammeter in said second lead, and the second wattmeter coil connected across the slide arm of said second ratio transformer and one side of said second ratio transformer.

3. A measuring apparatus with means for compensating the measurement for instrumentation loss comprising a testing transformer including a primary and an associated secondary, a power source, an isolation transformer having its primary connected across said power source, a first lead from a first side of said power source to the first side of said test primary, a second lead from a second side of said power source to the second side of said test primary, at least one instrument connected in said second lead, a third lead from one side of the secondary of said isolation transformer to said second side of said power source, a first ratio transformer, one side of said ratio transformer connected to the other side of the secondary of said isolation transformer, said ratio transformer including a first slide arm, a variable resistor connected between said first slide arm and the other side of said first ratio transformer, the other side of said ratio transformer connected to the second side of said test primary a second ratio transformer connected across said test secondary, a second instrument, said second ratio transformer including a slide arm connected to one side of said second instrument, a lead connecting the other side of said second instrument to said second ratio transformer, and means for moving said slide arms in unison to corresponding positions.

4. Apparatus according to claim 3 in which there are two instruments in said second lead, an ammeter and a wattmeter, the first wattmeter coil connected in series with said ammeter in said second lead, and the second wattmeter coil connected across the slide arm of said second ratio transformer and one side of said second ratio transformer.

5. A measuring apparatus for testing silicon steel samples with means for compensating the measurement for instrumentation loss comprising an alternating current power source, an isolation transformer having its primary connected across said power source, a test frame including a primary and secondary winding for receiving said samples, a first lead from a first side of said power source to the first side of said test frame primary, a second lead from a second side of said power source to the second side of said test frame primary, at least one instrument in said second lead, a third lead from one side of the secondary of said isolation transformer to said second side of said power source, a first ratio transformer, one side of said ratio transformer connected to the other side of the secondary of said isolation transformer, said ratio transformer including a first slide arm, a variable resistor connected between said first slide arm and the other side of said first ratio transformer, the other side of said ratio transformer connected to the second side of said test frame primary a second ratio transformer connected across said test frame secondary, said second ratio transformer including a slide arm, a fluxmeter connected across the slide arm of said second ratio transformer and one side of said second ratio transformer, and means for moving said slide arms in unison to corresponding positions.

6. Apparatus according to claim 5 in which there are two instruments in said second lead, an ammeter, and a wattmeter, the first coil of said wattmeter connected in series with said ammeter in said second lead, and the second wattmeter coil connected across the slide arm of said second ratio transformer and one side of said second ratio transformer.

7. Apparatus according to claim 6 in which a resistor is also connected in said second lead, and a volt ampere per pound circuit is connected across said resistor.

* * * * *